US007912625B2

(12) United States Patent
Cahoon

(10) Patent No.: US 7,912,625 B2
(45) Date of Patent: Mar. 22, 2011

(54) PORTABLE MEMORY AUTOMOBILE IGNITION SYSTEM

(75) Inventor: Colin Paul Cahoon, Dallas, TX (US)

(73) Assignee: Colin Paul Cahoon, Dallas, TX (US)

( * ) Notice: Subject to any disclaimer, the term of this patent is extended or adjusted under 35 U.S.C. 154(b) by 515 days.

(21) Appl. No.: 12/111,386

(22) Filed: Apr. 29, 2008

(65) Prior Publication Data

US 2008/0200209 A1 Aug. 21, 2008

Related U.S. Application Data

(63) Continuation-in-part of application No. 11/493,736, filed on Jul. 26, 2006, now Pat. No. 7,430,470, which is a continuation-in-part of application No. 11/236,167, filed on Sep. 27, 2005, now Pat. No. 7,233,857, which is a continuation-in-part of application No. 11/037,620, filed on Jan. 18, 2005, now Pat. No. 7,006,914.

(51) Int. Cl.
*G06F 7/00* (2006.01)
*G06F 19/00* (2006.01)
*H04Q 1/00* (2006.01)

(52) U.S. Cl. .......................... 701/115; 455/557; 307/10.1

(58) Field of Classification Search .................. 701/115, 701/114, 35, 29, 90; 455/557, 569.2; 307/10.1, 307/10.4–10.6; 340/825.69, 825.72
See application file for complete search history.

(56) References Cited

U.S. PATENT DOCUMENTS

| | | | |
|---|---|---|---|
| 5,973,411 A | 10/1999 | Tado et al. | |
| 6,430,488 B1 | 8/2002 | Goldman et al. | |
| 6,711,474 B1 | 3/2004 | Treyz et al. | |
| 7,006,914 B1 * | 2/2006 | Cahoon | 701/115 |
| 7,233,857 B2 * | 6/2007 | Cahoon | 701/115 |
| 7,425,886 B2 * | 9/2008 | Yoshii et al. | 340/5.72 |
| 7,430,470 B2 * | 9/2008 | Cahoon | 701/115 |
| 7,548,491 B2 * | 6/2009 | Macfarlane | 340/825.69 |
| 2003/0231550 A1 | 12/2003 | Macfarlane | |
| 2005/0021190 A1 | 1/2005 | Worrell et al. | |
| 2005/0151422 A1 | 7/2005 | Gilmour | |

FOREIGN PATENT DOCUMENTS

DE  2005001972 U1  5/2005

OTHER PUBLICATIONS

Article entitled "Start Sharing a Car," U.S. News & World Report, Dec. 25, 2006/Jan. 1, 2007 edition, pp. 85 and 86.

* cited by examiner

*Primary Examiner* — Hieu T Vo
(74) *Attorney, Agent, or Firm* — Colin P. Cahoon; Carstens & Cahoon, LLP

(57) ABSTRACT

A portable memory device consisting of a cell phone used in substitution of an automobile key and interfaced with an automobile onboard computer and ignition system. The portable memory device contains data that, when read by the onboard computer, enables the ignition system. The portable memory device is read and write capable, thereby allowing for data to be used by the onboard computer in conjunction with several automobile systems, and allowing for data to be transferred from said systems to the portable memory device by the onboard computer, thus facilitating vehicle operation and, in one embodiment, a method for managing a transportation fleet using portable memory devices in place of mechanical ignition keys and manual check-out and check-in procedures.

42 Claims, 3 Drawing Sheets

PORTABLE MEMORY AUTOMOBILE IGNITION SYSTEM

CROSS-REFERENCE TO RELATED APPLICATION

This application is a continuation-in-part of co-pending U.S. patent application Ser. No. 11/493,736 filed on Jul. 26, 2006, which is a continuation-in-part of U.S. patent application Ser. No. 11/236,167, filed Sep. 27, 2005, now U.S. Pat. No. 7,233,857, issued on Jun. 19, 2007, which is a continuation-in-part of U.S. patent application Ser. No. 11/037,620, filed on Jan. 18, 2005k, now U.S. Pat. No. 7,006,914 issued on Feb. 28, 2006.

BACKGROUND

1. Technical Field

The present invention relates to a portable memory drive or device used (in one embodiment) as a substitution of an automobile (or other engine driven conveyance) key, and an integrated onboard computer and ignition system. Specifically, the invention relates to the use of a portable memory drive or device containing data which is downloaded to an onboard processing system in communication with the automobile's ignition system, and other systems (such as the automobile's entertainment system, door lock system, and navigation system) and how, in one embodiment, this innovation can be integrated in a method for managing a transportation fleet, such as an automobile rental service.

2. Background of the Invention

Automobile ignition systems, as well as onboard computer systems, have changed dramatically in the last decade. For example, many modern automobiles no longer use keys with unique physical features in order to enable ignition systems. Rather, the automobile senses electronic data from, for example, a chip within the ignition key or a chip installed on a credit card sized data device kept in the driver's wallet. This electronic data enables the ignition system in the automobile like the traditional key.

Onboard computing systems are now used to control a number of different devices, such as various engine controls. Many innovative uses for an onboard computer system are reviewed and disclosed in, for example, U.S. Pat. No. 6,711,474, issued to Tryz, et al. on Mar. 23, 2004, and titled "Automobile Personal Computer System."

In an unrelated field, the size, dependability, and storage capacity of small portable memory devices has advanced at a quick pace. For example, a large variety of "thumb drives" or "jump drives" are now offered for sale to the consumer, typically as USB portable flash drives. Examples of these devices include the Mini 64 MB USB 2.0 Flash Drive manufactured by IOMEGA, the 512 MB Data Traveler I Full-Speed USB manufactured by Kingston Technology, and several flash drives manufactured by LEXAR Media, including the 1 GB JumpDrive Elite USB Flash Drive. These devices now can store so much data that they are considered mass storage devices, in addition to being portable memory devices. Even the least expensive of these portable memory devices, retailing for under ten US Dollars, is capable of storing large amounts of data, usually 64 MB or more. Yet, portable memory drives are, in many instances, no larger than a standard automobile ignition key. In fact, many of these devices are designed to be carried on key rings. The devices can be inserted in ports, for example a USB port, on a personal computer for reading or storing data, as they are both read and write capable. A common use for these portable memory devices is to transfer data from one computer to another. Music and video files can also be downloaded to these devices for playback on other media devices.

In a further unrelated field, cellular telephones or mobile phones ("cell phones") have become increasingly versatile and commonplace. Cell phones are in essence a type of portable memory device, capable of storing data including strings of numbers, music, binary code, and the like. Cell phones also have the capability of receiving and transmitting such data. Applicant's reference to "cell phones" herein is intended to include all portable electronic devices that utilize cellular technology, such as analog and digital cellular telephones and personal digital assistants (PDA's), that are portable enough to fit in a consumer's pocket, handbag, or purse.

A need exists, therefore, for an automobile ignition system that combines leading edge automobile computer functions with the latest development in portable memory drives or cell phone technology. Further, a need exists for an automobile ignition system that uses such portable memory devices for unique applications that are presently not available in the automotive field, such as a method for managing a transportation fleet.

SUMMARY OF THE INVENTION

In preferred embodiments, the invention utilizes as a mass storage device, or "portable memory device," a USB portable flash drive or cell phone containing unique data as a substitute for an automobile door/ignition key. This unique data, in combination with the portable memory device, provides numerous unique features to the automobile when all systems are integrated, including an onboard central processing unit, and are in communication with said portable memory device. In one embodiment, the portable memory device is inserted in a receiving port installed on the automobile. This receiving port can be, for example, a USB port located near or on the steering column in a location traditionally used for an ignition key and in the door in the location traditionally used for a door key. This receiving port can also be a cell phone or MP3 docking station resident somewhere inside the automobile. The portable memory device is inserted in such port by the driver. The port is connected to an onboard computer or central processing unit which initiates a read step in order to read security data from the portable memory device required to begin the automobile ignition sequence or unlock the door. If such data is available on the memory device, the automobile can be started as if the physical key has enabled a standard ignition system or door lock system.

In another embodiment in which the portable memory device is a cell phone, the device communicates with a receiver on board the automobile, thus transmitting data to the automobile's onboard central processing unit. Steps can be initiated thereby to unlock the automobile's doors and to initiate ignition of the automobile's engine. The communication can be via wireless capability, such as Bluetooth or WiFi, or using the cell phone's cellular capabilities in combination with a cellular receiving unit in the vehicle. As noted earlier, the cell phone can also have a docking station resident in the vehicle which acts as the interface. In such docking station embodiment, the cell phone is in essence a portable memory device that plugs directly into the interface similar to a flash card plugging into a USB port. In fact, such interface with a cell phone can alternatively be a USB port wherein a cable connects the USB port to the cell phone.

Once the portable memory device is in communication with the onboard computer, further data transmission can occur with other automobile systems. By way of example, music files can be accessed that have been stored on the portable memory device for playback on the automobiles stereo system via the onboard computer. Likewise, video files that have been stored on the portable memory device can be accessed for playback on the automobile's installed video equipment.

Data can also flow in the other direction. For example, music can be recorded from the automobile's radio for storage on the portable memory device. Dictation into an onboard speaker or telephone conversations from an onboard telephone can also be recorded onto the portable memory device. Data on engine or other system performance can be uploaded to the portable memory device and then downloaded later for analysis via a home computer, internet transmission, or cellular transmission.

Programmable driver unique settings can be stored on the portable memory device and read during the ignition and/or door unlocking sequence. For example, the driver's seat position, mirror positions, preset radio stations, and preferred temperature settings can all be stored on the portable memory device and read during the ignition and/or door unlocking sequence. All of these settings can also be changed and uploaded into the portable memory device by the driver.

Since, in the case of a USB flash drive or a cell phone having USB connectivity, the portable memory device is compatible with a standard personal computer, unique application-specific data can be loaded onto the portable memory device for use in the automobile while in operation. For example, adjustments to the automobile's engine monitoring and performance software can be made by downloading the data from the manufacturer's internet-based website to a personal computer and then onto the portable memory device. The data can then be accessed by the automobile's onboard computer. Such a system would make unnecessary the recall of automobiles to a maintenance facility to perform the same function. Similar functionality can be accomplished with cellular technology in the case of a cell phone acting as the portable memory device. Most cell phones today are capable of accessing the internet and downloading data, for example.

Database access in integration with a unit's navigation system, such as an onboard Global Positioning System ("GPS") unit, can also greatly enhance the features provided by such system. For example, customized databases of interest to a particular driver can be downloaded onto the portable memory device for access in conjunction with the GPS positioning information. A driver that is interested in the history the area that is being driven through can, in advance, download the database that integrates historical information with specific geographical locations. This information can then be played through the automobile's entertainment system, either over its radio or onboard video system. This would enable a driving historical tour, as an example. Other navigation unit database information, such as dining recommendations or service station locations, can be easily updated by the same method. Likewise, data regarding where the vehicle has traveled can be uploaded to the portable memory device for analysis. This feature may be of benefit in providing insurance analysis, tracking the vehicles of certain persons having legal limitations set on areas where they can travel (such as convicted felons on probation), or can even be analyzed by parents in tracking driving habits of their children.

The use of a portable memory device as described herein provides unique methods for managing a transportation fleet, such as a car rental service, truck rental service, or governmental vehicle fleet. This method replaces the present check-out and check-in procedures used by rental car and rental truck agencies wherein a physical key is issued to the customer upon check-out and a manual verification of the miles used and fuel consumed is made during check-in. Instead, the rental customer is issued or uses a portable memory device that is programmed at the time of check-out of the vehicle. (The terms "vehicle" and "conveyance" are used interchangeably herein and include, without limitation, automobiles, trucks, and motorcycles.) Alternatively, rental programming can be sent to the rental customer's cell phone. This programming can include data that is specific to the individual rental customer, referred to herein as "customized data," such as the customer's seat position preferences, mirror position preferences, radio station presets, environmental control presets, and other data specific to the individual customer that is maintained by the rental agency in a centralized database. The customer uses the portable memory device to initiate the unlock and ignition sequence on the conveyance, as further described herein.

At the end of the rental period, information is uploaded from the vehicle to the portable memory device for use during the check-in of the vehicle with the rental agency. For example, the number of miles driven, the level of fuel in the gas tank, and the time and date of return can all be uploaded into the portable memory device prior to check in. This means that during check-in the rental customer need only return the portable memory device to the rental agency, which can then download the information previously described to complete the check-in process. In the embodiment using a cell phone, the information can be downloaded from the customer's cell phone. Further, the customer's convenience preferences, such as the seat position, mirror position, radio station settings, and environmental settings can be uploaded to the portable memory device prior to check-in and downloaded to the rental agency's central database for use during the future rentals to that individual customer as their customized data.

The invention, therefore, provides an automobile (or other conveyance) access and ignition system that combines leading edge automobile computer functions with the latest development in portable memory devices and cell phone technology. Further, the invention provides for an automobile ignition system that uses such portable memory devices for unique applications that are presently not available in the automotive field.

BRIEF DESCRIPTION OF THE DRAWINGS

The novel features believed characteristic of the invention are set forth in the appended claims. The invention itself however, as well as a preferred mode of use, further objectives and advantages thereof, will be best understood by reference to the following detailed description of illustrative embodiments when read in conjunction with the accompanying drawings, wherein:

DETAILED DESCRIPTION

Figure 1:
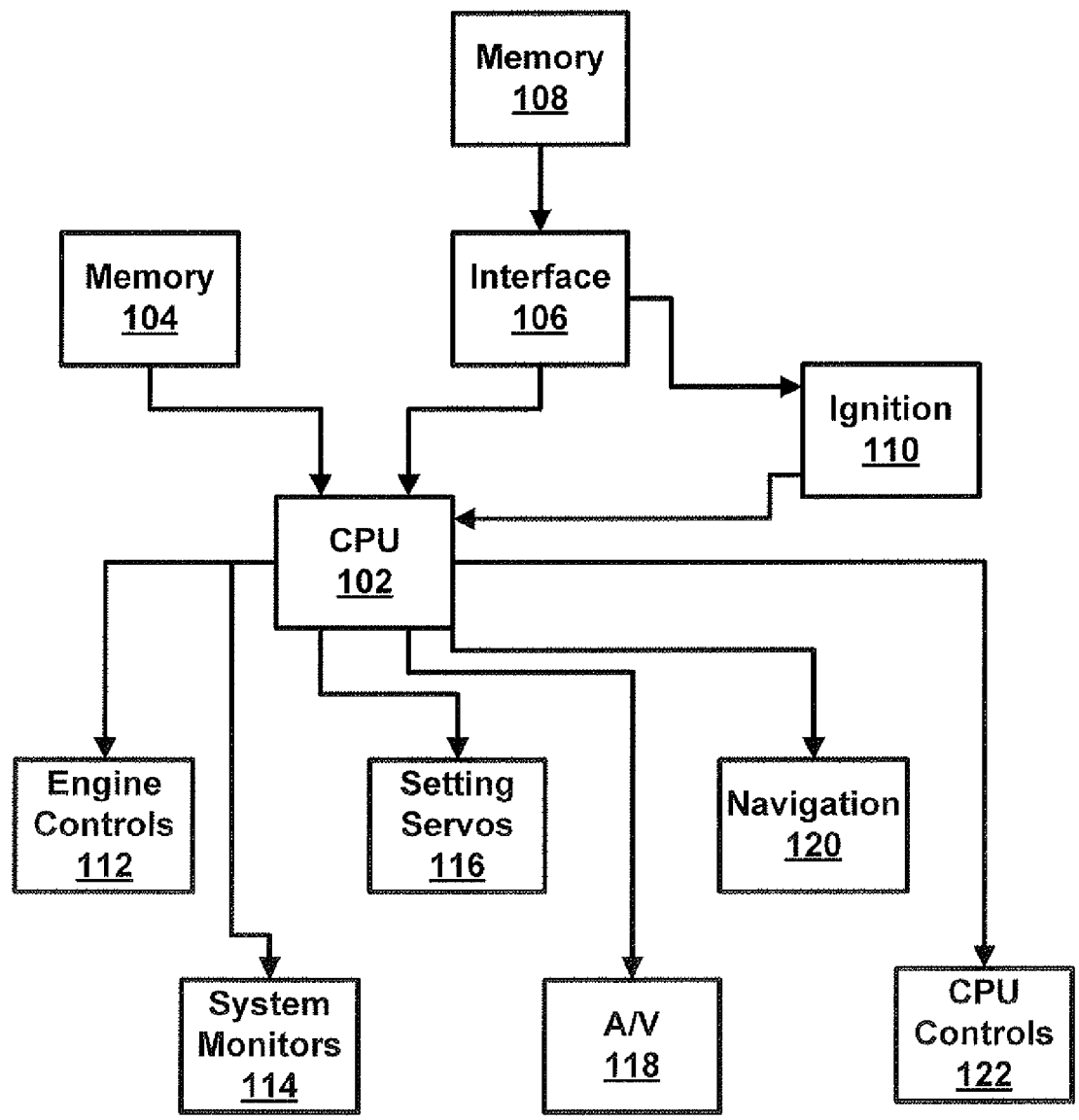
FIG. 1 is a flow chart showing the basic data flow of one embodiment of the invention.

FIG. 1 is a flow chart illustrating the data flow in one embodiment of the invention. The preferred embodiment of the invention utilizes an onboard computer that is installed in the automobile. In this application, the terms "computer," "central processing unit (CPU)," and "processing unit" are all used interchangeably and refer to any device capable of facilitating the execution of programming steps and interfacing with other systems and memory devices.

Referring to FIG. 1, the onboard computer 102 is interfaced with a memory device 104 that is also installed in the automobile or other conveyance, such as a boat, airplane, motorcycle, or any motorized conveyance (thus the terms "driver" and "operator" are used interchangeably herein). This memory device 104 may be internal to the onboard computer 102. The memory device 104 may also be a separate memory drive electrically connected to the computer 102, but located internal to the automobile and not easily removed. The onboard computer 102 is also electrically connected to an interface 106 to a portable memory device 108. This interface 106 in one embodiment is a standard USB port common to personal computers. When referred to and claimed herein, "USB" means USB, USB 2.0, and any follow on development of such interface technology. In an alternative embodiment, this interface 106 is a "Bluetooth" or similar wireless interface. The term "wireless interface" used herein includes Bluetooth, WiFi, IrDA, and similar technologies. In another embodiment, this interface 106 is a cell phone, or a receiver/transmitter that utilizes cell phone technology. In another embodiment this interface 106 is a cell phone docking station. Applicant's use of the term "hard wire" connection in the cell phone embodiment refers to a physical wire direct connectivity between the cell phone and the onboard computer 102, such as is provided by a cell phone docking station or a USB connection to the cell phone.

The interface 106 is provided in lieu of an ignition switch requiring a key. Consequently, in the embodiment using a USB port, the interface 106 is installed in the automobile in a location easily accessible to the driver when the driver is sitting in the driver's seat, such as on or near the steering column. Alternatively, the interface in the USB port configuration can be located in the door of the conveyance in place of door locks. In the embodiment using a cell phone as the portable memory device 108, the interface 106 can be, for example, a Bluetooth or other wireless device which communicates with similar technology resident in the cell phone, or it can be a cellular telephone resident in the vehicle such that the communication is via cellular technology between the two cell phones. The interface 106 installation can be done by the manufacturer or as an after market installation to, for example, a fleet of automobiles. In practice, again in the embodiment using a USB port, the driver inserts the portable memory device 102 into the interface 106 in order to enable the ignition system 110 of the automobile and/or unlock its door. This act of inserting the memory device 108 into the interface 106 accomplishes all of the system enablements nominally accomplished by the insertion of a physical key into the door key hole and/or the ignition switch of an automobile and, as will be described in more detail below, enables several other systems and features of the invention. This invention can be combined with an additional button or switch used to actually start the vehicle, but such button or switch, in a preferred embodiment, is inoperable until the portable memory device 108 is in communication with the onboard computer 102.

It should be understood that the terms "ignition system" and "ignition" do not necessarily connote the system used to start an internal combustion engine. For example, the ignition system in a hybrid automobile merely enables the vehicle to begin operation, as the vehicle may operate under either battery power or a battery that is being charged by an internal combustion engine. Likewise, when Applicant's invention is used with an electrical car or other conveyance that uses battery power, such as a golf cart, the initiation of the ignition system allows for operation of the motor that drives the conveyance as opposed to initiating the starting of an internal combustion engine. Consequently, Applicant's use of the terms "ignition system" and "ignition" should be interpreted broadly to refer to the system that is a part of the conveyance with which Applicant's invention is being used that initiates the ability to use the conveyance.

It should be understood that when using the terms "portable memory device" 108 and its "interface" 106, these terms are meant to include all technology allowing for the storage of data on portable memory devices 108 and their related interfaces 106 required to access the data on said devices 108. This includes, but is not limited to, FireWire, Memory Stick, USB 2.0 Micro Drive, ScanDisk, MPEG-1 Audio Layer 3 (MP3) devices, wireless devices such as cellular telephones and personal digital assistants (PDA's), and similar present and emerging technologies. Any mass storage devices 106 in a portable format, small enough to fit in a consumer's pocket, and the necessary interfaces 108 allowing for communication with same are contemplated by this invention, even such devices and interfaces that have not yet been developed but that can be used to accomplish the goals and results of the invention.

Software provided by the automobile manufacturer, or the manufacture of the systems described by the invention in the event of an after-market installation, allows the driver to use any off-the-shelf portable memory device or mass storage device 108 that is compatible with the interface 106 for use with the invention described herein. Without limitation, but by way of explanation, the automobile owner can utilize an off-the-shelf USB flash drive and import data onto this memory device 108 by software provided specifically for this purpose or downloading the data from an online source via the automobile owner's personal computer. Other devices 108 could include a micro drive such as originally developed by IBM, a wireless card using Bluetooth technology, or a cell phone. A biometric "fingerprint" reader can also be combined with the device 108 in order to enhance security. The data that is stored on the memory device 108 provides recognition data that the automobile's computer 102 reads and recognizes in order to enable the ignition sequence and/or the opening of any locks installed on the automobile. This initiation data can be changed from time-to-time as a security feature or can be permanent read-only data. Cryptography and authentication sequences can be used such that security features are constantly changed. The initiation data can also be time limited such that the memory device 108 can only be used as described herein for a set period of time before it must be "refreshed" with new initiation data. For example, in the car rental context a memory device 108 can be programmed to operate in such capacity for only as long as the rental contract for an individual user provides. Thus, if the car is rented for one week, the customer must return to the rental facility (or otherwise refresh the data) to update the initiation data after one week or will be unable to start the rented automobile. For company or fleet cars or trucks that must be returned daily, the initiation data can be valid for only 24 hours, thus requiring return of the vehicle every day and enhancing theft deterrence. Along the same lines, a valet "key" can be limited to so many starts of the engine or initiation cycles, again enhancing theft deterrence.

An alternative embodiment of the invention allows for the automobile's ignition system to communicate independently with the portable memory device 108 by direct connection to the interface 106. This allows for automobile operation for systems configured such that the onboard computer 102 is not a necessary component of engine and other essential system operations. It should also be noted that any portable memory device 108 requiring a power supply can also be powered and/or recharged by physical connection to its respective interface 106.

Data stored on the portable memory device 108 can be processed by the onboard computer 102 in order to facilitate the operations of a number of the automobile systems. For example, door locks can be operated. As another example, various engine controls 112, controlling such things as fuel flow, air flow, and ignition timing, can be electrically connected to the onboard computer 102. When adjustments to such controls are found to be necessary or desirable, data facilitating such changes can be loaded onto the portable memory device 108 by, for example, downloading such information from a manufacturer's online source onto a personal computer and then onto the memory device 108. This data is then downloaded from the memory device 108 onto the automobile's computer 102 when installed in the interface 106. This data is then used by the computer 102 to change the engine control features 112 to facilitate the desired adjustments.

Many luxury and semi-luxury cars save desired driver preference settings on a number of comfort and/or entertainment features. For example, the driver's seat position, powered mirror position (controlled by setting servos 116), environmental control settings, and radio presets are all stored and registered to identify with a specific driver. Due to the limited storage capacity of these systems and the limited physical controls accessing devices used to manipulate this information, automobiles today store such driver preference settings for only a few (typically two) drivers. The instant invention facilitates such feature by storing setting information in the portable memory device 108 that allows the various setting servos 116 (and other devices) to move to the appropriate positions and settings when the driver associated with those positions and settings uses the memory device 108. Since every individual driver can have his own portable memory device 108, the instant invention facilitates the transfer of an infinite number of individual desired driver preference settings for any number of vehicles. Such capability is beneficial in the instance of a number of drivers sharing a single automobile, such as a company automobile shared by a number of individuals, and in instances when many automobiles are used by one or more individuals, such as a fleet of automobiles used by a number of different drivers. In the example of a fleet of automobiles, individual drivers can maintain their own personalized portable memory devices 108 for use on any of the fleet automobiles, thus allowing the instant adjustment of all driver preference settings as a part of the ignition or door unlocking sequence. Driver preferences for rental car company customers can also be stored the same way, so that the customer need not manually adjust mirrors and seat positions with every automobile rented. This information can be uploaded to the device 108 the first time the renter uses a rental vehicle and then downloaded to a central database upon return of the vehicle to the rental company. The next time the renter rents from the company, the data may be downloaded to a device 108 and used to set the same or similar preferences in the next rental vehicle. In an alternative embodiment, but having the same benefits, driver preference settings can be stored on the computer's onboard memory 104 with the driver recognition data stored on the portable memory device 108.

The portable memory device 108 can also provide data utilized with the entertainment or audio/visual (A/V) system in the automobile 118 (also referred to collectively as "entertainment media" by Applicant). Typically, the A/V system 118 comprises a stereo system (AM/FM radio receiver, Compact Disc drive, etc. . . . ) and, in many instances, includes a video system capable of playing DVD's or VHS tapes. Some automobiles further incorporate radio reception by satellite and television broadcast over the visual portion of the system. The instant invention allows for entertainment media to be downloaded onto the memory device 108 for use with the automobile's entertainment system 118. For example, music files can be downloaded from any number of sources, such as online sources or copied from music storage devices, onto the portable memory device 108. These music files are then accessed by the automobile's computer 102 and directed to the automobile's stereo system 118 for playback. The same basic concept is used to transfer video files from the portable memory device 108 to the automobile's video system 118. In the fleet or rental car field, a specific genre of music, such as classic jazz or 1970's rock and roll, can be downloaded on a memory device 108 to match the known preferences of the renter or fleet driver.

The portable memory device 108 can also interface with the automobile's navigation system 120. Global Positioning System (GPS) units are becoming a common feature on automobiles. Such GPS units typically have a limited database containing street address information and logic that enables suggestions on routing. Some of these units also have a limited amount of information available on various services with logic that enables routing to such services, such as the most direct route to a known service station. Use of the portable memory device 108 allows for the updating of these databases as, for example, new streets are built or various businesses close or are added to certain locations. In other words, the portable memory device 108 allows for the periodic updating of all the database information on the navigation unit 120. This updating in an airplane embodiment can take the place of memory card updates used in the prior art. Further, the portable memory device 108 can be programmed with a geographical security feature such that, if the vehicle is taken beyond a predefined boundary, the vehicle will shut down. A parent can thus limit a child's ability to take a car beyond a certain predetermined number of streets or neighborhoods. Business drivers can be limited to a predetermined route. Also, rental cars, or others, can be programmed to shut down prior to entering prohibited areas, such as another country, or outside a certain state or county. The same feature can be used to limit the hours a certain driver can use the car (prohibiting, for example, night-time driving) separately from, or in combination with, geographic boundaries, thus allowing enforcement of court orders on driving restrictions, driving restrictions imposed on student drivers and the like, or accessibility to company vehicles. All of these features can be combined with a warning (aural, visual, or both) that the memory device 108 program limits in this regard are about to be exceeded, thus letting the driver know to, for example, turn around before exceeding the permitted geographical boundary.

Due to the storage capacity of the portable memory device 108, the ability to update the data on the portable memory device 108, and its integration with an automobile computer 102, other powerful uses of the navigation system 120 in conjunction with other automobile systems are enabled by the instant invention. For example, the portable memory device 108 can provide both the software and data storage functions to enable a multi-media presentation tied to the geographical location of the automobile. The present invention provides that a driver can receive historical information regarding the area through which the automobile is being driven over either the stereo system or the video system 118. The use of such feature, as well as others described herein, may require additional controls 122 accessible to the driver and linked directly to the computer. These controls 122 can comprise a simple numeric pad or small keyboard accessible to the vehicle occupants or similar devices known in the art.

In an alternative embodiment, the portable memory device 108 is GPS capable itself (as is the case with many cell phones). Consequently, the vehicle's navigation system 120 can be limited to the interfaces residing with the vehicle necessary to utilize the GPS capabilities of the portable memory device. For example, the navigation system 120 can consist of simply a display screen and various controls, while the GPS functionality resides in the cell phone 108.

The portability of the memory device 108, and the fact that it is read and write capable, also adds useful features to the invention for uploading data from various automobile systems. For example, the automobile computer 102 can be connected to various system monitors 114. These system monitors 114 can include monitoring a number of engine performance and functioning parameters as well as trip data such as distance traveled per trip, top and average speed, fuel consumed, etc. . . . Data relating to the information monitored by the system monitors 114 can be collected by the automobile's computer 102 for temporary storage in onboard memory 104 or collected and stored directly on the portable memory device 108. In the event it is initially stored on the onboard memory 104, this information can then be uploaded to the portable memory device 108. The data can then be downloaded by, for example, a personal computer connected to an online source, for analysis of engine performance and other stored data. Such analysis can identify engine problems and be used for other maintenance purposes. When the portable memory device 108 is a cell phone, such data can be transmitted in real time via a cellular call or WiFi connectivity to a maintenance analyst.

This aspect of the invention has useful applications in the car rental business as well. A renter can be issued a portable memory device 108 for use with a rental car or, alternatively, rental enabling data can be loaded onto such device 108 maintained by the renter. Upon the return of the car, all trip information can be retrieved by the rental company making car return a simple matter of returning the portable memory device 108 or dumping data from the device 108 to the rental car company's computer. This trip information can include driving patterns, such as average and high speeds, brake usage, etc. . . . , that can be used to promote safe driver discounts. The mileage and fuel usage information can also be processed for quick and accurate returns by, for example, rental car company employees using portable reading devices during the return check-in.

Along the lines of data storage, the portable memory device 108 can be used to record and store music and video files that were played in real time on the automobile's A/V system 118. Likewise, some automobiles have onboard or built-in cell phone systems. The portable memory device 108 can store telephone numbers for use with this telephone system and can upload recordings of telephone conversations. (When the portable memory device 108 is a cell phone, the onboard or built-in cell phone can be used as the interface 106 with the device 108 or omitted entirely.) Likewise, the integration of a built-in or plug-in microphone with the computer 102 of this invention allows for dictation with the dictation data stored directly on the portable memory device 108. In communication with the navigation unit 120, data can also be loaded onto the portable memory device 108 detailing the exact route taken on trips as well as times associated with stops. This information can be useful for parental monitoring of children drivers or company monitoring of company employees.

The cell phone docking station embodiment of the present invention will now be recounted in order to review many of the features described and claimed herein. The operator of the vehicle will have data on the operator's cell phone 108 which can be used to first unlock the door on the vehicle that the operator wants to use. This might be done by the wireless or radio transmission of data from the cell phone 108 to a receiver or interface in the automobile, or by a cellular phone call, for example programmed as a speed dial, placed to a cell phone receiver resident in the automobile, either of which initiates the unlocking sequence of the vehicle. The vehicle operator then enters the vehicle and connects the cell phone 108 with an interface 106, which in this instance is a docking station 106 for the cell phone 108. This docking station 106 provides for a physical connection between an output port on the cell phone 108 and a receiving port resident in the automobile. Thus, the docking station 106 is an interface 106 as previously described. This creates an access to the resident memory of the cell 108 phone just as plugging a cable into a cell phone and into a computer allows for the transfer of data (such as pictures or music files) between the cell phone 108 and the onboard computer 102 as previously described herein. Such data transfers can now take place between the cell phone and the automobile. Thus, all of the music files stored on the cell phone can be accessed by the entertainment media of the vehicle. GPS capability of the cell phone can also be accessed by the central processing unit 1023. As a result, with such embodiment it would not be necessary to have a separate GPS unit resident in the vehicle, but, merely, a video screen which accesses the GPS capabilities of the cell phone. All of the other data and features previously described can also be accessed by the CPU 102 resident in the vehicle in communication with the cell phone 108 as it resides in its docking station 106, such as automatically adjusting driver unique settings. Such docking station 106 can be physically located in any convenient location, such as somewhere in the dash area or between the driver and passenger front seats. This embodiment further encourages hands-free cellular telephone use while operating a vehicle, as the cell phone 108 can be integrated with the speaker, microphone, and control options resident in the vehicle. In one embodiment, an air bag activation can also be processed by the CPU 102 to direct an emergency telephone call which also relates the vehicle's location using the GPS capabilities of either the telephone or capabilities resident to the vehicle. Since cell phones are typically identified to a single individual, this emergency call can also relate the personal information of the driver to emergency responders, such as name, age, sex, and any personal medical issues or disabilities. It should be noted that many of the features discussed with regard to a cell phone 108 and its docking station also apply to an embodiment using an MP3 108 and an MP3 docking station 106.

Figure 2:
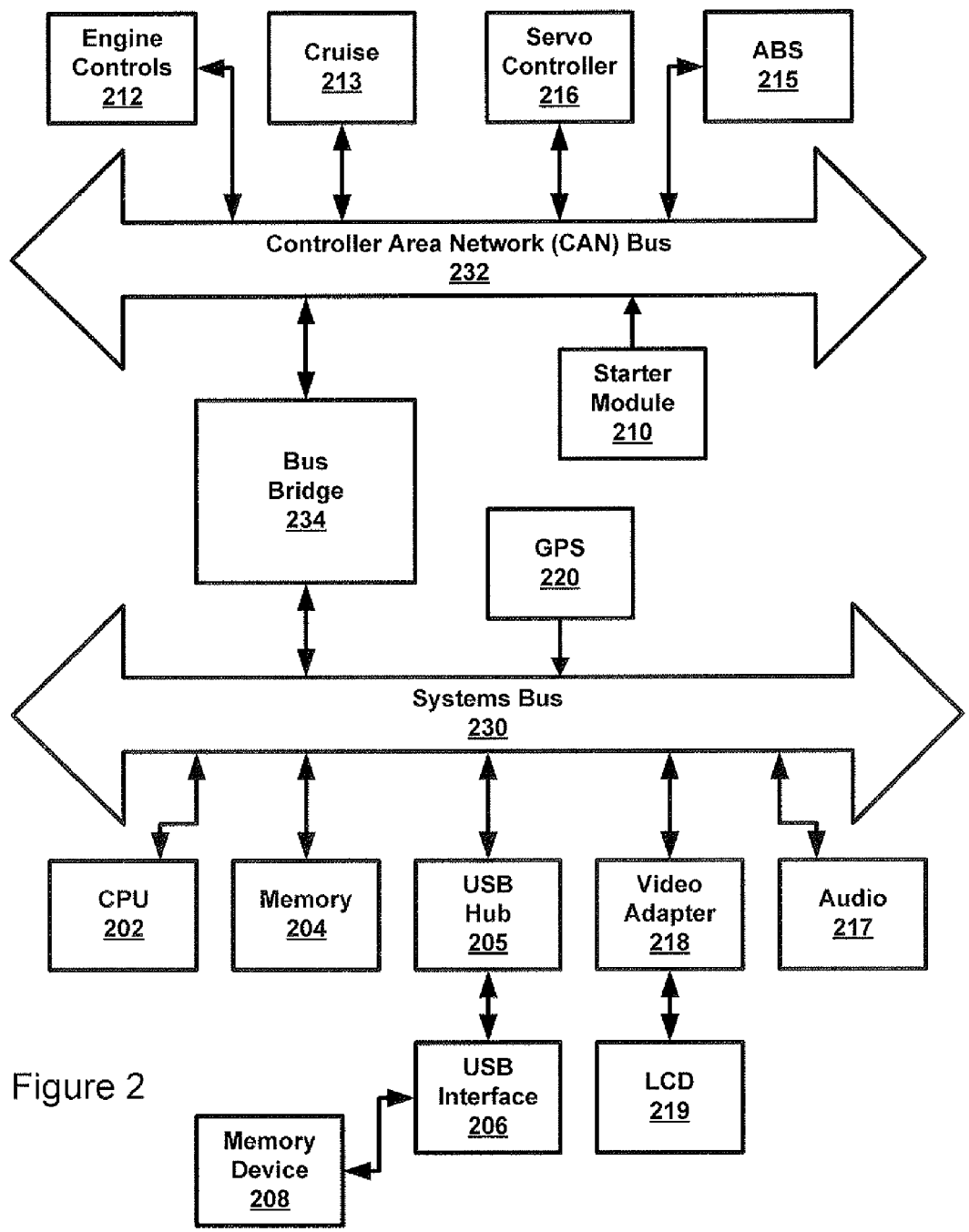
FIG. 2 is a flow chart showing the systems interface of one embodiment of the invention.

FIG. 2 is a flow chart showing the system interfaces of one embodiment of the invention utilizing the invention with an automobile. FIG. 2 shows two electrical buses 230, 232 comprising a controller area network (CAN) bus 232 and a systems bus 230 interconnected by a bus bridge 234. By way of example only, the CAN bus 232 is typical of prior art systems and drives the engine controls 212, the cruise control 213, the servo-controllers 216, which can control the seat positions and electronic mirror positions, and the ABS controller 215 for controlling the anti-lock brake system. The CAN bus 232 is also interfaced with the starter module 210.

The systems bus 230, on the other hand, handles many of the automobile systems including the GPS unit 220, the audio system 217, which can include the radio, a cd-player, etc., and a video adapter 218. The video adapter 218 in turn can drive the video equipment 219, such as an LCD video screen 219.

In the embodiment disclosed in FIG. 2, the system bus 230 is also connected to a central processing unit 202 along with onboard memory 204. In the particular embodiment illustrated using USB technology, the system bus 230 is also connected to a USB hub 205, which in turn is connected to a USB interface 206. The USB interface 206 is used to interface with the portable memory device 208 as previously described. The USB hub 205 and interface 206 can be aftermarket additions or originally installed equipment.

Although most of the examples provided have involved the use of the invention with the automobile, it should be understood by one familiar with the art that the same advantages of the invention can be had when used with other means of conveyance, such as an airplane, a boat, a tractor or other farm equipment, a piece of heavy machinery, a motorcycle, a snowmobile, a jet ski, an electric cart, a moped, and any other motorized means of conveyance. As an example of an aviation-specific application, many airplanes today utilize GPS systems that require constant updating of the database used by the GPS system in order to reflect changes in the airspace system. Typically, these databases are updated on a monthly basis and require either the inserting of a new memory card or the downloading of additional data onto an existing memory card from an online source onto a memory card writing device. The same functionality can be used with the portable memory device 108, whereby current navigational data can be downloaded to the portable memory device 108 periodically from an online source and, in turn, downloaded to the onboard GPS unit for the airplane.

Many of the same functions that have been described with regard to automobile rentals or automobile fleet usage have applications in other fields as well, such as boat rentals, motorcycle rentals, and other recreational vehicles such as jet skis and snowmobiles. For example, geographical limitations can be imposed on jet skis such that they become inoperative anytime they are removed from a certain body of water. Geographical limitations can also be imposed on snowmobiles such that they cannot be driven into areas of restricted access, such as wilderness areas. Further, rental usage information similar to that described with regard to rental cars can be uploaded during usage of the conveyance for later analysis by the renter.

Figure 3:
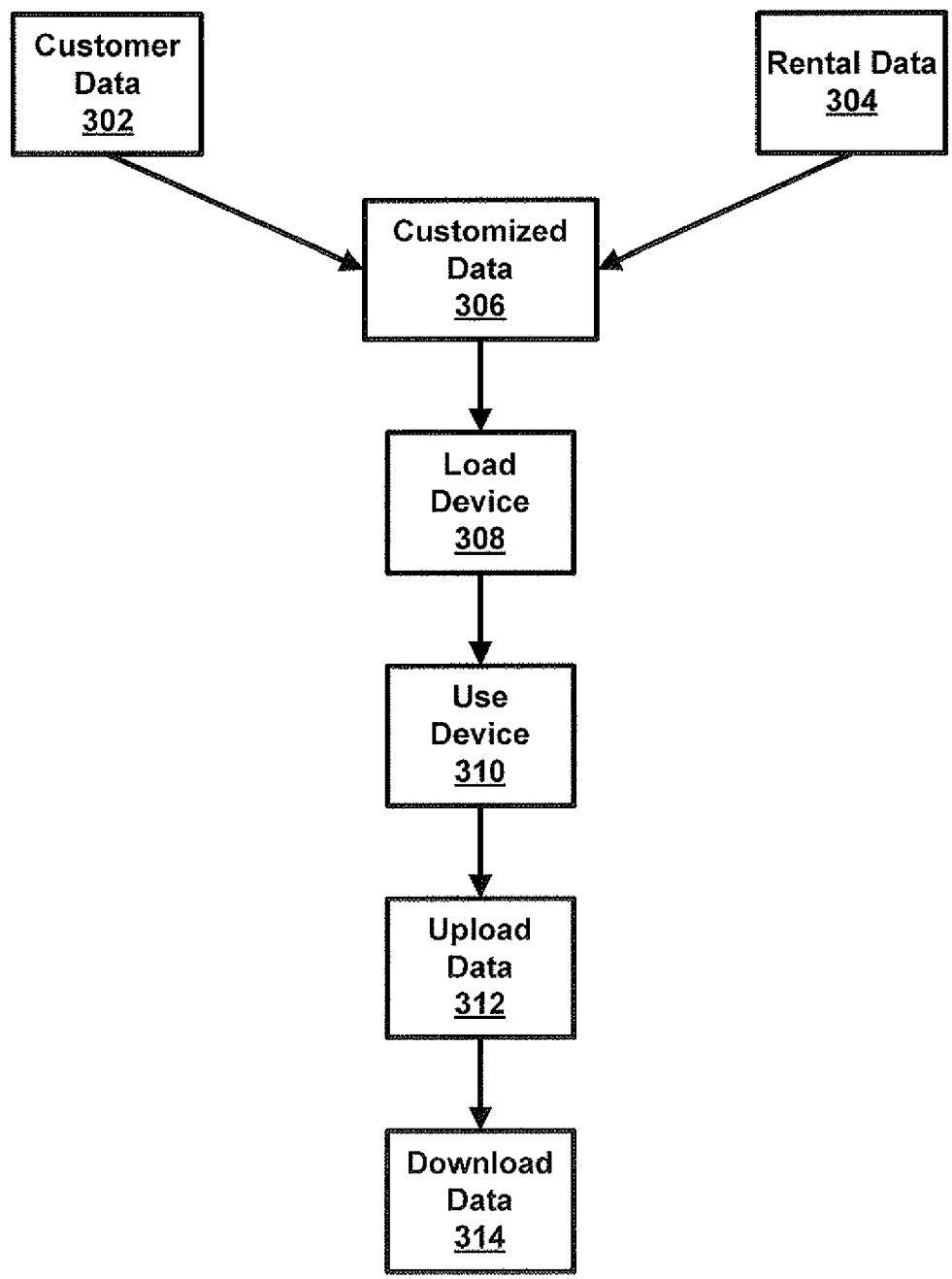
FIG. 3 is a flow chart showing a method for managing a transportation fleet.

FIG. 3 is a flow chart illustrating one embodiment of a method for managing a transportation fleet in accordance with Applicant's invention. FIG. 3 will be described in the context of a rental car company, but the same principles apply regardless of the conveyance used or the type of fleet managed.

A fictitious customer, John Smith, who frequents a fictitious rental car company, Acme Rentals, is used to explain the procedure illustrated in FIG. 3. John Smith contacts Acme Rental, via telephone or via Acme Rental's website for example, and makes a reservation for the use of a rental automobile to be checked out from one of Acme Rental's airport locations for a three day rental. This reservation is stored on a centralized database used by Acme Rental's business, as is presently well known in the prior art, as "rental data" 304. In the case of a regular customer such as John Smith, Acme Rental has accumulated, pursuant to this invention, "customer data" 302 pertaining to John Smith as well. This customer data can include data that is presently collected by rental agencies on their customers, such as the customer's preferred automobile type. However, in accordance with this invention, additional data making up the customer data 302 is also accumulated with regards to Mr. Smith, including items such as, but without limitation or restriction, his preferred seat settings on one or more vehicle models, his preferred mirror settings on one or more vehicle models, his preferred environmental settings, such as temperature and fan speeds, and preferred radio presets corresponding to the type of music or type of radio station that Mr. Smith prefers to listen to regardless of the geographical location of the rental. This type of information is referred to by Applicant as "convenience settings." Additional customer data 302 can include a play list of music corresponding to Mr. Smith's musical taste. All of this information comprises customer data 302 maintained by Acme Rental on John Smith. In one embodiment, John Smith can update or add to his customer data 302 by accessing Acme Rental's website. He can, for example, select a music genre or even select specific songs to be included in his customer data 302.

As noted previously, based on the reservation made by John Smith, Acme Rental also maintains rental data 304 for that specific transaction. For example, the rental data 304 can include the type of automobile requested, the date of the rental, the check-out location and check-in location. Although this information 304 is called "rental data," such term also includes the same type of information when used in other fleet management contexts, such as a company vehicle fleet used by employees. For the purpose of this rental example transaction, and in accordance with one embodiment of this invention, Mr. Smith's customer data 302 and the rental data 304 are merged to create "customized data" 306 for this rental transaction. This customized data 306 is retained in a centralized database for retrieval at the time of the vehicle check-out. The customized data 306, in accordance with the invention, must contain rental data 304 but need not contain customer data 302.

On the date in question, Mr. Smith arrives at the Acme Rental airport location (or wherever the vehicle is located) for the purpose of checking out the vehicle for "use" or "operation" of the vehicle (such terms are used interchangeably herein). At this time, or sometime prior to his arrival, the customized data 306 is loaded 308 into the portable memory device previously described herein. This loading step 308 can take place, for example, at the check-out counter or can be done remotely by virtue of, for example, a device located on a rental company's shuttle bus. It can also be loaded into to Mr. Smith's cell phone anytime in advance of use of the vehicle, when his cell phone is the portable memory device to be used. In the event the portable memory device is a flash drive, it can be physically handed to Mr. Smith at a check-out counter, on the bus as he is being dropped off at the vehicle rental lot, or can be waiting for him at or near the vehicle. Again, the portable memory device can also belong to Mr. Smith and the loading step 308 can take place, for example, via the internet to a computer used by Mr. Smith or at a kiosk at the rental lot or a data transfer to a cell phone. In any event, once Mr. Smith has the portable memory device with the loaded customized data 306, he can use 310 it with the rental vehicle as previously described above during operation of the vehicle.

In one embodiment of the invention, updates to Mr. Smith's customer data 302 can be uploaded 312 to the portable memory device during use 310. For example, the seat positions, mirror positions, and radio music selections associated with Mr. Smith's use of the vehicle can all be uploaded 312 to the portable memory device for later comparison to and updating of the customer data 302 already on file. For the purpose of a new customer, this data can be used for customer data 302 for future rentals.

The invention also contemplates the uploading 312 of "use data" during the rental period or immediately prior to check-in of the vehicle. The use data relates to the operation of the vehicle by Mr. Smith. The use data uploaded 312 to the portable device can be rather rudimentary in nature, such as the miles driven and fuel consumed, or can be extremely detailed depending on the amount of information the rental company desires to maintain on Mr. Smith. For example, use data regarding average and maximum speeds driven by Mr. Smith, the severity and frequency of braking and acceleration, time and dates relating to the operation of the vehicle, and even the exact routing of the vehicle during the rental pursuant to cross-linking with the GPS unit on board the vehicle can all be accumulated as use data and uploaded 312 to the portable memory device for later analysis by the rental company. This information can be useful for a number of purposes including the assessment of the type of diving risk that Mr. Smith is or, in the example of a company fleet, monitoring the adherence of the driver to company regulations and safety requirements. As with the potential for uploading 312 additional customer data 302 to the portable memory device, the use data can be uploaded 312 throughout the rental period or during one or more sessions prior to check-in of the vehicle.

At the time that Mr. Smith checks in the vehicle with Acme Rental (the end of the rental period), he either returns the portable memory device which now contains the uploaded data on both the use of the vehicle and any additions to the customer data 302 or otherwise transfers such data 302 to Acme Rental. In one embodiment of the invention, Mr. Smith need do nothing more than return the portable memory device to complete the check out process from his standpoint. The rental agency then downloads 314 the data contained on the portable memory device in order to complete the transaction. In another embodiment, Mr. Smith downloads 314 the data on his portable memory device, for example at a kiosk at the rental return lot, over the internet at a later date, or via a cell phone data transfer. This download 314 transfers the previously uploaded data 312 to an Acme Rental computer that is typically, although not necessarily, data linked to a centralized database for storage, analysis, and processing of the data.

It should be noted that this procedure makes it unnecessary to physically check the vehicle for the number of miles driven or the amount of fuel used. To the extent that a receipt is desired to be issued to Mr. Smith upon check-in, one can be printed after the data is downloaded by the rental company from the portable memory device or Mr. Smith can print his own at, for example, a check-in kiosk or from a printer connected to a computer accessible to Mr. Smith. This arrangement is ideal for vehicle rentals of vehicles that are not located at a central location, such as the emerging car sharing schemes developed by Zipcar.

The present trend of cell phone technology is to use a cell phone in place of a credit card or debit card for charging purchases to a consumer's account. The use of a cell phone as the portable memory device can integrate this feature with the rental of a vehicle, for example. Using the previously mentioned example of vehicle sharing schemes in large cities, a consumer can access a database via their cell phone that identifies the location of parked vehicles that are nearby to the consumer's location. This can be done relatively easily if the consumer's cell phone is also GPS enabled. In other words, this initial data inquiry will connect to a database that can compare the GPS location of the cell phone with available vehicles and identify the location of these vehicles for rental purposes. Once these vehicles are identified, the consumer can then select one of these vehicles for rental during a certain time period by further communication with the rental car database. The previously mentioned customized data 306 is then loaded 308 to the consumer's cell phone. The consumer then proceeds to the location where the vehicle is located. Once a consumer arrives at this location, the cell phone can be used 310 with the rental and operation of the vehicle as previously described. At the end of the rental process, the consumer can report that the rental period is finished via a cell phone data transfer. This data transfer might include information about where the vehicle was left, or such information could have been uploaded to the cell phone 312 at the end of the rental process and provided automatically during the download 314 sequence. During the download 314 sequence, the cell phone can also be charged for the rental in question, or it could have been charged in advance when the rental was first requested.

In an alternative embodiment of the invention, the portable memory device is used in the method for managing a transportation fleet described by FIG. 3 but not additionally used as the substitute for the key that initiates the ignition sequence for the vehicle. In this alternative embodiment, a USB port, cell phone docking station, MP3 docking station, or other interface is located somewhere in a convenient location for use by the operator of the vehicle. In this alternative embodiment the use of the portable memory device in the vehicle can accomplish all of the tasks previously described with the exception of the automobile ignition initiation and door opening feature. This alternative embodiment may be preferable for use on vehicles for which it is less expensive to make an after market adaptation to the vehicle separate and apart from the vehicle's ignition system.

One of the advantages of the present invention is that transportation fleet management companies (or even families with multiple cars and drivers for that matter) need no longer maintain discreet ignition keys for each individual vehicle. Portable memory devices can be reprogrammed upon every use and used throughout the fleet, regardless of the individual vehicle that is associated with an individual portable memory device for a particular use. In fact, each individual user can maintain their own portable memory device(s), such as cell phones, which are simply uploaded with data to support the use of a given vehicle.

As previously discussed, additional customized data 306 that can be loaded onto the portable memory device can include a time-out function which makes the portable memory device or the vehicle nonfunctional after a certain period of time or a geographical limitation function which makes the operation of the vehicle impossible beyond a certain defined geographical limitation. In the previous example of Mr. Smith such customized data 306 can prohibit the vehicle from traveling outside the continental United States by deactivating the engine whenever the GPS senses that the automobile has approached the border. The device can also be programmed to time-out after a given time period (for example after four days), such that Mr. Smith is required to return the vehicle at the end of his three day rental or the portable memory device will not continue to function as a key. These features are theft deterrents and insure compliance with the requirements of the terms of the rental.

The foregoing is merely illustrative of the principals of this invention, and various modifications can be made by those skilled in the art without departing from the scope and spirit of the invention. It should be understood, for example, that the systems described herein can be adapted to other vehicles besides automobiles, such as motorcycles, boats, and airplanes.

The invention claimed is:

1. An ignition system for a transportation conveyance comprising:
    an onboard processing unit in electrical communication with the ignition system; and
    a portable memory device, wherein said memory device is read and write capable and has a storage capacity of at least 64 MB, wherein further said portable memory device can communicate with said onboard processing unit, thereby allowing data transfer from said device to said processing unit for initiating the operation of the transportation conveyance.

2. The ignition system of claim 1 further comprising a portable memory device receiving port, wherein said receiving port is in communication with said processing unit.

3. The ignition system of claim 1 wherein said receiving port consists of a cell phone docking station.

4. The ignition system of claim 1 wherein said portable memory device is a cell phone.

5. The ignition system of claim 4, wherein the cell phone can communicate with said onboard processing unit by hard wire connection.

6. The ignition system of claim 4 wherein the cell phone can communicate with said onboard processing unit by cellular transmission.

7. The ignition system of claim 4 wherein the cell phone can communicate with said onboard processing unit by wireless interface.

8. The ignition system of claim 1 wherein said portable memory device is read in order to enable operator preference settings for the conveyance components, said components comprising mirrors and an adjustable seat.

9. The ignition system of claim 1 wherein said portable memory device is accessible for the transfer of data from the portable memory device to an entertainment media in the conveyance.

10. The ignition system of claim 1 wherein said portable memory device interfaces with an onboard navigation system.

11. The ignition system of claim 1 wherein said portable memory device interfaces with engine controls.

12. The ignition system of claim 1 wherein said portable memory device interfaces with system monitors.

13. The ignition system of claim 1 wherein said portable memory device interfaces with the door locking system of conveyance.

14. The ignition system of claim 1 wherein said portable memory device in an MP3 device.

15. A transportation conveyance ignition system that utilizes a read and write capable portable memory device in lieu of an ignition key, said ignition system comprising:
    a portable memory device consisting of a cell phone; and
    an onboard processing unit in electrical communication with the ignition system;
    wherein said portable memory device is capable of communicating with said onboard processing unit, thereby allowing data transfer with said processing unit for initiating the operation of the conveyance.

16. The ignition system of claim 15 wherein the portable memory device communicates with said onboard processing unit by hard wire connection.

17. The ignition system of claim 16 wherein said hard wire connection comprises a cell phone docking station resident inside said conveyance.

18. The ignition system of claim 15 wherein the cell phone is capable of communicating with said onboard processing unit by cellular transmission.

19. The ignition system of claim 15 wherein the cell phone is capable of communicating with said onboard processing unit by wireless interface.

20. The ignition system of claim 15 wherein said portable memory device is read in order to enable operator preference settings for conveyance components, said components comprising side mirrors and an adjustable seat.

21. The ignition system of claim 15 wherein said portable memory device has a storage capacity of at least 64 MB.

22. A method for managing a transportation fleet having vehicles available for use, said method comprising the steps of:
    (a) accumulating customized data relating to the use of a vehicle;
    (b) loading said customized data onto a portable memory device consisting of a cell phone;
    (c) using the portable memory device containing said customized data in conjunction with the use of the vehicle;
    (d) loading use data associated with the use of the vehicle onto said portable memory device; and
    (e) downloading said use data from the portable memory device.

23. The method of claim 22 wherein the customized data of step (a) comprises customer data and rental data.

24. The method of claim 23 wherein the customer data comprises a customer's convenience settings.

25. The method claim 24 wherein said convenience settings comprise preferred seat settings.

26. The method of claim 22 wherein said use data of step (d) comprises the distance the vehicle traveled during use.

27. The method of claim 22 wherein said use data of step (d) comprises information regarding the speed of the vehicle during use.

28. The method of claim 22 wherein the use of the portable memory device of step (c) comprises using the portable memory device to initiate the ignition sequence of the vehicle.

29. The method of claim 22 wherein the use of the portable memory device of step (c) comprises using the portable memory device to initiate the unlocking of the vehicle.

30. The method of claim 22 wherein the use of the portable memory device of step (c) comprises interfacing the portable memory device with a global positioning system unit onboard the vehicle.

31. The method of claim 30 wherein the use of said vehicle is limited to a geographic boundary by virtue of the interface between the portable memory device and the global positioning system.

32. The method of claim 22 wherein the use of the vehicle is time limited by the customized data of step (a).

33. The method of claim 22 wherein step (d) further comprises loading customer data relating to the use of the vehicle onto said portable memory device.

34. The method of claim 33 wherein said customer data comprises a customer's convenience settings.

35. A method for managing a transportation fleet, wherein said fleet comprises vehicles each having an ignition system that utilize a read and write capable portable memory device in lieu of an ignition key, wherein said portable memory device comprises a cell phone, said ignition system comprising an onboard processing unit in electrical communication with the ignition system, wherein said portable memory device is in communication with said onboard processing unit, thereby allowing data transfer with said processing unit for initiating the operation of the associated vehicle, wherein the method comprises the steps of:
    (a) accumulating customized data relating to the use of a vehicle;

(b) loading said customized data on a portable memory device;

(c) using the portable memory device containing said customized data in conjunction with the operation of the vehicle.

36. The method of claim 35 further comprising the step of:
(d) loading use data associated with the operation of the vehicle onto said portable memory device.

37. The method of claim 36 wherein said use data of step (d) comprises the distance the vehicle traveled during operation.

38. The method of claim 36 wherein step (d) further comprises loading customer data relating to the operation of the vehicle onto said portable memory device.

39. The method of claim 38 wherein said customer data comprises a customer's convenience settings.

40. The method of claim 35 further comprising the step of:
(e) downloading said use data from the portable memory device.

41. The method of claim 35 wherein said portable memory device is read during step (c) in order to enable operator preference settings for vehicle components, said components comprising side mirrors and an adjustable seat.

42. The method of claim 35 wherein the customized data of step (a) comprises customer data and rental data.

* * * * *